(12) United States Patent
Shibata et al.

(10) Patent No.: US 6,445,411 B1
(45) Date of Patent: Sep. 3, 2002

(54) CAMERA CONTROL SYSTEM HAVING ANTI-BLUR FACILITY

(75) Inventors: Masahiro Shibata, Tokyo; Yoshihiro Ishida, Kawasaki, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/034,782

(22) Filed: Mar. 4, 1998

(30) Foreign Application Priority Data

Mar. 14, 1997 (JP) .............................................. 9-060853

(51) Int. Cl.$^7$ .............................. H04N 3/14; H04N 7/14; H04N 5/232
(52) U.S. Cl. ................. 348/213; 348/14.05; 348/14.08; 348/229; 348/296; 348/333.02
(58) Field of Search ................................ 345/326, 327, 345/329, 330, 352, 354; 348/14.03, 14.05, 14.07, 14.08, 14.09, 143, 152, 153, 159, 169, 207, 208, 211, 213, 214, 222, 229, 294, 296–298, 333.01, 333.02, 552; 358/906, 909.1; 396/52–55, 213, 233, 234, 235, 373, 374

(56) References Cited

U.S. PATENT DOCUMENTS

| | | | | |
|---|---|---|---|---|
| 5,053,875 A | * | 10/1991 | Ishii et al. .................. | 348/208 |
| 5,128,769 A | * | 7/1992 | Arai et al. .................. | 348/363 |
| 5,477,264 A | * | 12/1995 | Sarbadhikari ............... | 348/231 |
| 5,497,192 A | * | 3/1996 | Ishizuka ..................... | 348/208 |
| 5,526,045 A | * | 6/1996 | Oshima ....................... | 348/208 |
| 5,589,875 A | * | 12/1996 | Fujita .......................... | 348/211 |
| 5,737,018 A | * | 4/1998 | Shimizu et al. ............. | 348/363 |
| 5,745,223 A | * | 4/1998 | Ikeda .......................... | 348/211 |
| 5,801,770 A | * | 9/1998 | Paff et al. ................... | 348/211 |
| 5,898,459 A | * | 4/1999 | Smith .......................... | 348/211 |
| 5,940,630 A | * | 8/1999 | Washisu ...................... | 396/55 |
| 6,151,066 A | * | 11/2000 | Ito .............................. | 348/169 |

* cited by examiner

Primary Examiner—Wendy R. Garber
Assistant Examiner—Ngoc-Yen Vu
(74) Attorney, Agent, or Firm—Robin, Blecker & Daley (57) ABSTRACT

A varying command to vary the attitude of a video camera selected from one or more video cameras and a variation speed at which to vary the attitude of the video camera are inputted, the attitude of the video camera is varied on the basis of the inputted varying command and variation speed, the electronic shutter speed of the video camera whose attitude is being varied is calculated on the basis of the inputted variation speed of the attitude of the video camera, and the electronic shutter speed of the video camera whose attitude is being varied is controlled on the basis of the calculated electronic shutter speed of the video camera.

12 Claims, 8 Drawing Sheets

CAMERA CONTROL SYSTEM HAVING ANTI-BLUR FACILITY

BACKGROUND OF THE INVENTION

1. Field of the Invention

The present invention relates to a camera control system or the like which is suitable for use with, for example, a video camera having a panhead, such as a surveillance camera or a video conference system.

2. Description of Related Art

As a related art, there is a system which is capable of controlling an image pickup module (for example, zooming, focusing or exposure) of a camera from a computer via a communication medium such as RS-232C and is capable of controlling the panning and tilting attitudes of the camera with the camera mounted on a panhead. A camera control system has also been proposed which enables an external control terminal via a network to make the computer (referred to as the camera server) execute a control command to control the image pickup module of the camera or a control command to control the panning or tilting of the camera.

However, in either of the aforesaid systems, while the video camera is being panned or tilted by controlling the panhead, if an image is picked up with a normal shutter speed of $1/60$ sec of an image pickup device such as a CCD, a motion blur will occur in the picked-up image, so that each single point on a subject may be recorded on several pixels.

BRIEF SUMMARY OF THE INVENTION

The present invention has been made in view of the above-described problems, and its object is to provide a system which predicts the extent of an image motion blur from the rotating speed of a panhead and prevents occurrence of the image motion blur on the basis of this prediction.

To achieve the above-described object, in accordance with one embodiment of the present invention, there is provided a camera control system capable of controlling an image pickup direction of a video camera, which system comprises varying command inputting means for inputting a command to vary the image pickup direction of the video camera, varying means for varying the image pickup direction of the video camera on the basis of the command inputted by the varying command inputting means, speed inputting means for inputting a variation speed at which to vary the image pickup direction of the video camera, calculating means for calculating a shutter speed of the video camera the image pickup direction of which is being varied by the varying means, on the basis of the variation speed inputted by the speed inputting means, and shutter speed control means for controlling the shutter speed of the video camera the image pickup direction of which is being varied by the varying means, on the basis of the shutter speed of the video camera calculated by the calculating means.

In accordance with another aspect of the present invention, there is provided a camera control system capable of controlling an image pickup direction of a video camera, which system comprises varying command inputting means for inputting a varying command to vary the image pickup direction of the video camera, varying means for varying the image pickup direction of the video camera at a predetermined variation speed on the basis of the varying command inputted by the varying command inputting means, calculating means for calculating a shutter speed of the video camera the image pickup direction of which is being varied by the varying means, on the basis of the predetermined variation speed, and shutter speed control means for controlling the shutter speed of the video camera the image pickup direction of which is being varied by the varying means, on the basis of the shutter speed of the video camera calculated by the calculating means.

In accordance with another aspect of the present invention, there is provided a control method for a camera control system capable of controlling an image pickup direction of a video camera, which method comprises a varying command inputting step of inputting a varying command to vary the image pickup direction of the video camera, a varying step of varying the image pickup direction of the video camera on the basis of the varying command inputted by said varying command inputting step, a speed inputting step of inputting a variation speed at which to vary the image pickup direction of the video camera, a calculating step of calculating a shutter speed of the video camera the image pickup direction of which is being varied by said varying step, on the basis of the variation speed inputted by said speed inputting step, and a shutter speed control step of controlling the shutter speed of the video camera the image pickup direction of which is being varied by said varying step, on the basis of the shutter speed of the video camera calculated by said calculating step.

In accordance with another aspect of the present invention, there is provided a control method for a camera control system capable of controlling an image pickup direction of a video camera, which method comprises a varying command inputting step of inputting a varying command to vary the image pickup direction of the video camera, a varying step of varying the image pickup direction of the video camera at a predetermined variation speed on the basis of the varying command inputted by the varying command inputting step, a calculating step of calculating a shutter speed of the video camera the image pickup direction of which is being varied by the varying step, on the basis of the predetermined variation speed, and a shutter speed control step of controlling the shutter speed of the video camera the image pickup direction of which is being varied by the varying step, on the basis of the shutter speed of the video camera calculated by the calculating step.

In accordance with another aspect of the present invention, there is provided a storage medium which stores an operation processing program for a camera control system capable of controlling an image pickup direction of a video camera, the storage medium allowing the camera control system to execute the following operation processing: varying the image pickup direction of the video camera on the basis of an inputted varying command to vary the image pickup direction of the video camera, calculating a shutter speed of the video camera the image pickup direction of which is being varied, on the basis of an inputted variation speed of the image pickup direction of the video camera, and controlling the shutter speed of the video camera the image pickup direction of which is being varied, on the basis of the calculated shutter speed of the video camera.

In accordance with another aspect of the present invention, there is provided a storage medium which stores an operation processing program for a camera control system capable of controlling an image pickup direction of a video camera, the storage medium allowing the camera control system to execute the following operation processing: varying the image pickup direction of the video camera at a predetermined variation speed on the basis of an inputted varying command, calculating a shutter speed of the video camera the image pickup direction of which is being varied, on the basis of the predetermined variation speed, and controlling the shutter speed of the video camera the image pickup direction of which is being varied, on the basis of the calculated shutter speed of the video camera.

The above and other objects, features and advantages of the present invention will become apparent from the following detailed description of preferred embodiments of the present invention, taken in conjunction with the accompanying drawings.

DETAILED DESCRIPTION OF THE INVENTION

Preferred embodiments of the present invention will be described below in detail with reference to the accompanying drawings.

(First Embodiment)

Figure 1:
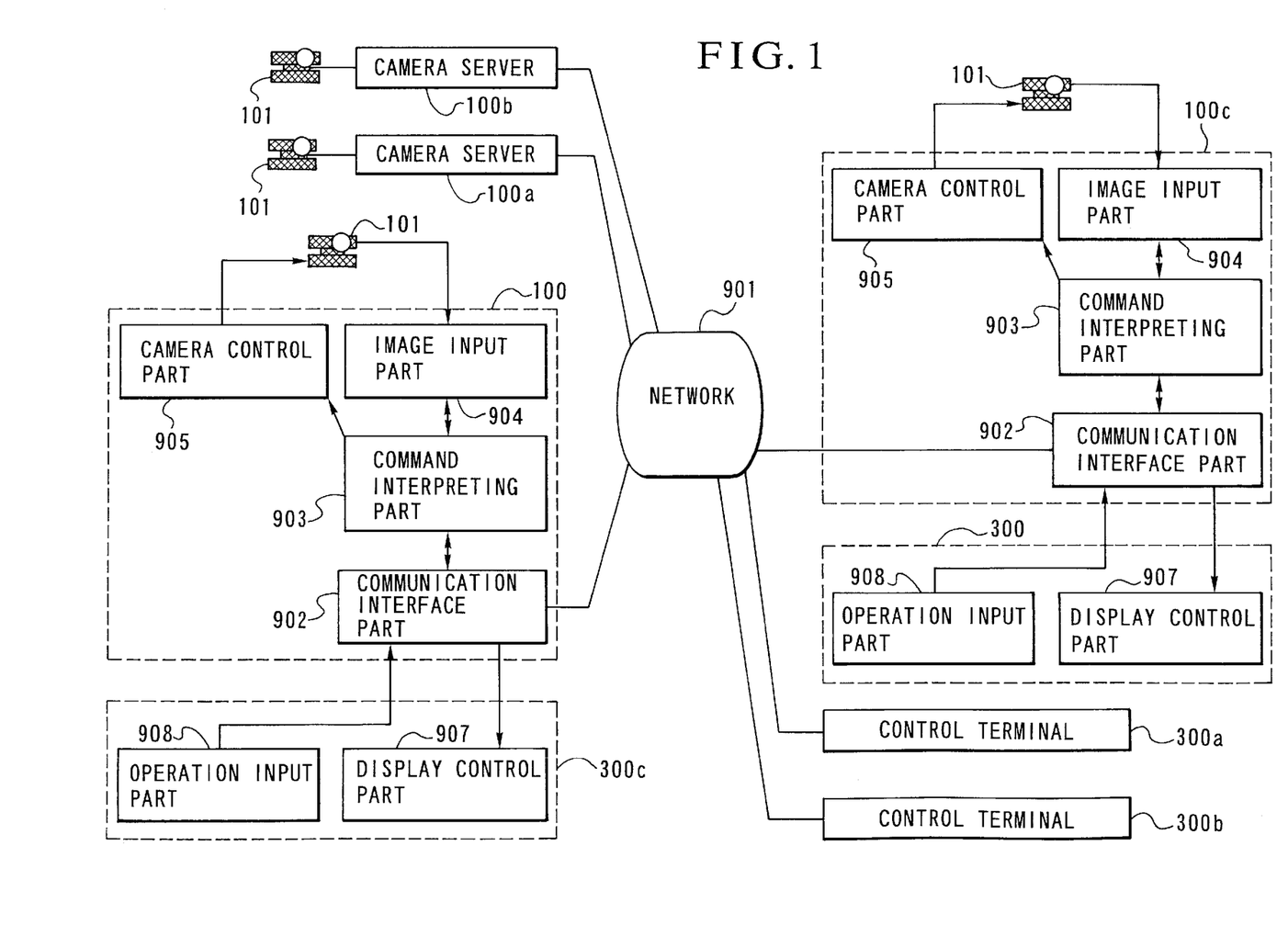
FIG. 1 is a conceptual diagram of a camera control system according to a first embodiment of the present invention.

FIG. 1 is a conceptual diagram showing a camera control system according to a first embodiment of the present invention. Incidentally, the illustration of FIG. 1 is not limited to only the first embodiment, and relates to all embodiments of the present invention.

The camera control system is connected to a network 901 such as a LAN, a WAN or the Internet. In FIG. 1, the camera control system is connected to the Internet, as will be described below in detail.

Control terminals 300, 300a, 300b and 300c are situated at remote locations and output camera control commands therefrom. Video cameras 101 can be controlled from outside for panning, tilting or zooming, and are respectively connected to camera servers 100, 100a, 100b and 100c. The video cameras 101 connected to the camera servers 100, 100a, 100b and 100c are operated in accordance with a control command sent from a control terminal, and signals of input images inputted from the cameras 101 are transmitted to the control terminal.

In the first embodiment, as shown in FIG. 1, the camera servers 100, . . . and the control terminals 300, . . . may be individually connected to the network 901, or a plurality of units in each of which a camera server and a control terminal are integrated may be connected to the network 901. Such units each including a camera server and a control terminal are capable of effecting mutual communication which enables a camera situated on one side to be operated on another side via the network 901.

In accordance with the camera control system according to the first embodiment, an infinite number of camera servers and control terminals of the above-described types may be connected to each other via the network. However, the present invention can also be accomplished in such a way that one camera server and one control terminal are connected to each other via the network.

Camera servers connected to a WWW (World Wide Web) system on the Internet serve as WWW servers, and WWW browser software is installed in some of control terminals and mutual communication is performed between the control terminals and the camera servers by means of HTTP (Hyper Text Transfer Protocol) or others.

In the WWW system, a user accesses a server using another protocol, directly or by using a gateway unit, and the access result is finally displayed to the user in the form of hyper text. Specifically, a WWW browser requests information such as desired data from a WWW server which is a site in which document data and image data are stored, in accordance with a URL (Uniform Resource Locator) indicative of a site in which the desired data is stored. The WWW server transmits the corresponding document data or image data to the WWW browser in response to that request.

In the camera server 100, a communication interface part 902 transmits and receives signals to and from each of the camera servers and the control terminals via the network 901. A command interpreting part 903 interprets a received signal and transmits a predetermined operation signal to the camera 101 to be controlled. An image input part 904 receives an input image from the camera 101 and performs signal processing on the image. A camera control part 905 is provided for controlling the operation of the camera 101, such as panning, tilting and zooming.

In the control terminal 300, a display control part 907 displays an image received from a camera server which is being accessed, or the state of control of the camera 101 connected to the camera server. An operation input part 908 requests a camera control right from the camera server which is being accessed, or instructs the camera 101 to alter the state of panning, tilting or the like, or inputs set values of camera parameters.

Incidentally, in such camera control system, a plurality of cameras may be connected to the camera server 100.

Figure 2:
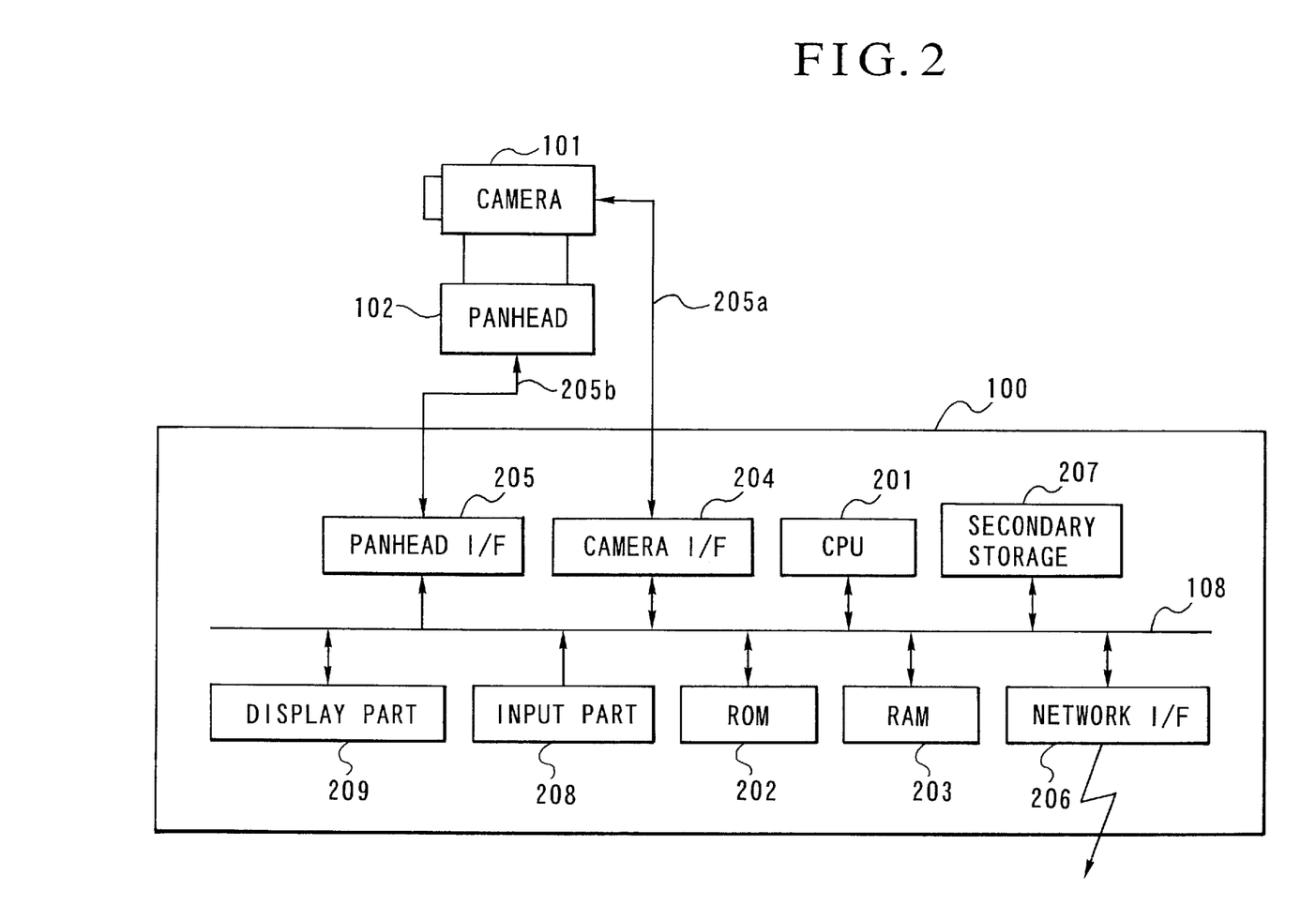
FIG. 2 is a block diagram of the construction of a camera server in the camera control system shown in FIG. 1.

FIG. 2 is a block diagram showing in detail the construction of the camera server 100. Referring to FIG. 2, a CPU 201 collectively executes various kinds of control in the camera server 100. A ROM 202 stores a control program to be executed by the CPU 201. A RAM 203 provides the work area required for the CPU 201 to execute various kinds of control. A bus 108 interconnects these constituent elements for communication with each other.

A camera I/F 204 serves to receive an image signal from the camera 101. A panhead I/F 205 transmits to a panhead 102 of the camera 101 a control command to make the camera 101 execute a panning or tilting operation (such as an image pickup direction of the camera 101 or a variation speed of the image pickup direction of the camera 101).

Communication ports 205a and 205b are provided for transferring information between the camera 101 and the camera server 100, and may use a general-purpose communication port such as RS-232C.

A network I/F 206 is connected to the network 901 and realizes communication between the camera server 100 and another device (such as a control terminal) on the network 901.

In the above-described construction, the CPU 201 may be arranged to load into the RAM 203 a camera server program stored in a secondary storage 207 and execute the loaded control program.

An input part 208 includes a mouse, a keyboard or the like, and enables a user to input control commands to the camera 101 shown in FIG. 2 or to input them to the camera 101 connected to the network 901, via the network I/F 206. The control commands include control commands, such as control commands for zoom magnification, panning, tilting or the like of the camera 101 or a speed adjustment command to adjust a variation speed during panning or tilting.

A display part 209 includes a CRT, an LCD or the like and is provided for displaying a picked-up image on the basis of an image signal from the camera 101 shown in FIG. 2 or the camera 101 connected to the network 901.

The input part 208 and the display part 209 enable the user to control the camera 101, and enable the camera server 100 to function as a control terminal (to be described later in detail) for displaying a picked-up image obtained from the camera 101. An arrangement corresponding to the input part 208 and the display part 209 may also be additionally provided on the camera server 100 as required.

Figure 4:
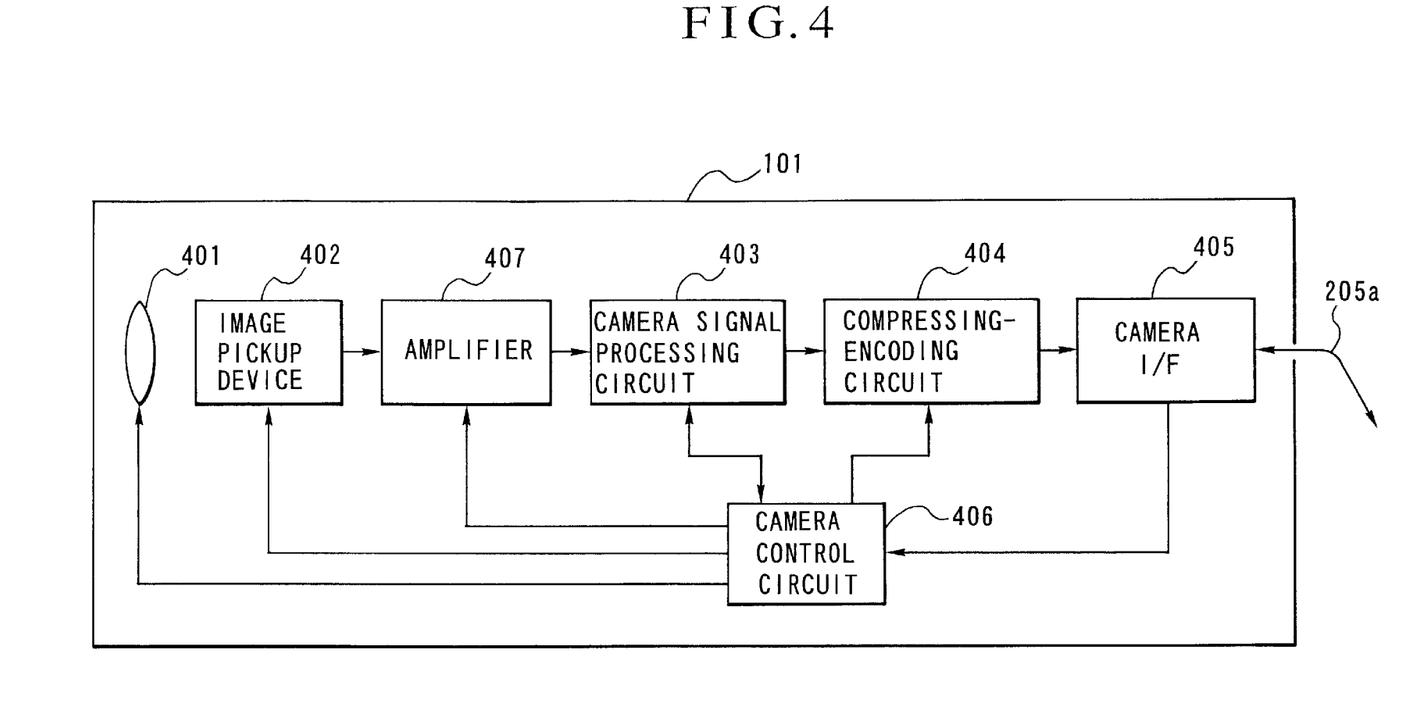
FIG. 4 is a block diagram of a video camera in the camera control system shown in FIG. 1.

FIG. 4 is a diagrammatic view of the construction of the camera 101. A camera I/F 405 receives a camera control signal transmitted from the communication port 205a and transmits the camera control signal to a camera control circuit 406. The camera I/F 405 also transmits image data to the camera server 100. The camera control circuit 406 includes a CPU or the like, and executes various kinds of control on the basis of the camera control signal transmitted from the camera I/F 405. Reference numeral 401 denotes a lens unit which includes a zooming lens, a focusing lens, an iris and the like.

An image pickup device 402 is a photoelectric conversion device including a CCD or the like, and adjusts its electronic shutter speed in accordance with a command from the camera control circuit 406. A camera signal processing circuit 403 separates the signal obtained from the image pickup device 402 into a luminance signal and color-difference signals, and performs A/D conversion of those signals. The camera signal processing circuit 403 also transmits to the camera control circuit 406 the signal level obtained from the image pickup device 402. If the signal level is low, the camera control circuit 406 opens the iris provided in the lens unit 401 and an amplifier 407 increases the gain of the signal level obtained from the image pickup device 402.

As described above, the amplifier 407 serves to increase the gain of the signal level obtained from the image pickup device 402. A compressing-encoding circuit 404 compresses and encodes the signal A/D converted by the camera signal processing circuit 403, and transmits image data to the camera I/F 405.

Figure 3:
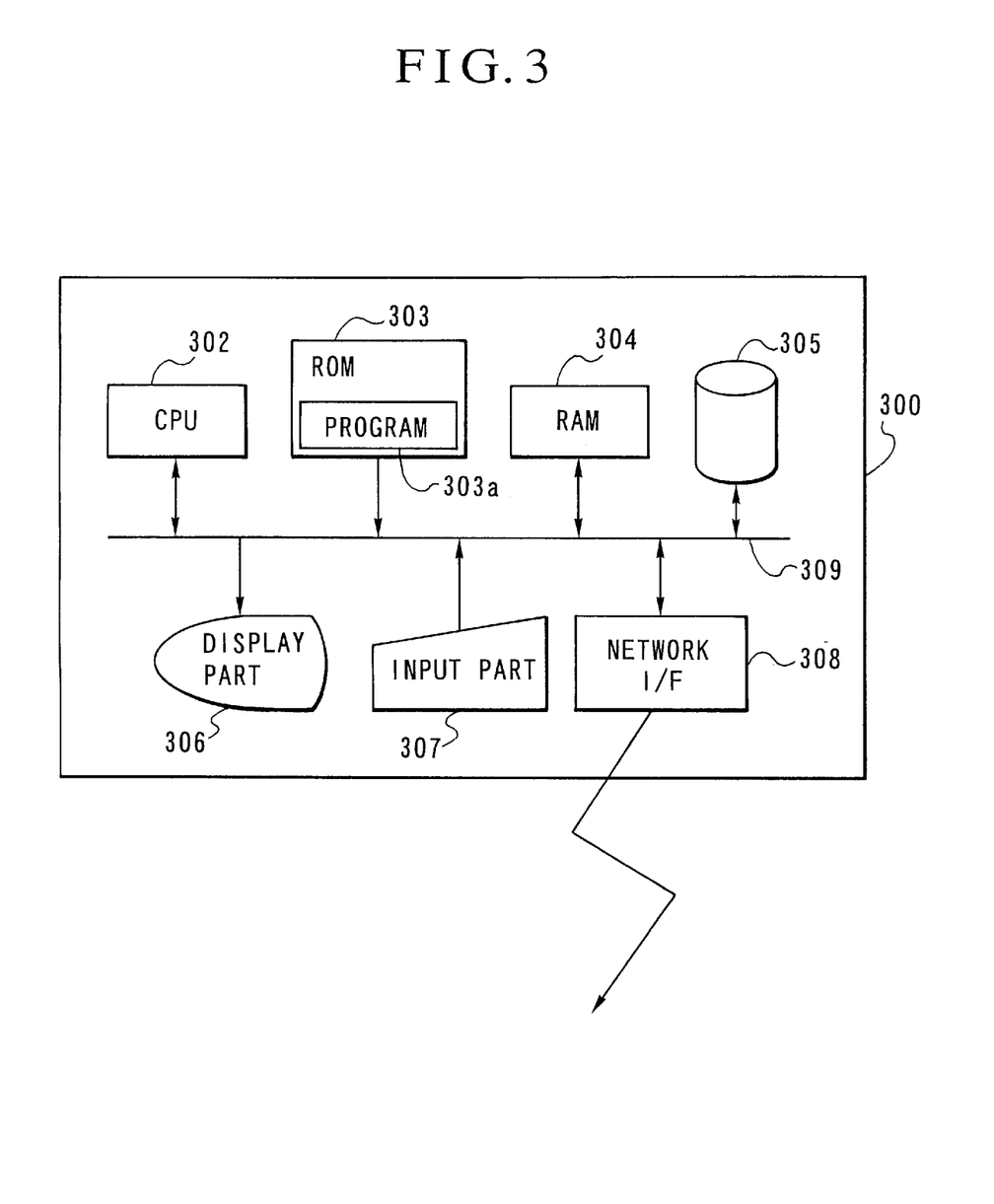
FIG. 3 is a block diagram of a control terminal in the camera control system shown in FIG. 1.

FIG. 3 is a block diagram showing in detail the construction of the control terminal 300 for controlling the camera 101 connected to the camera server 100 via the network 901 and for displaying an image inputted from the camera 101. In the construction of the control terminal 300 shown in FIG. 3, a CPU 302 transmits various control commands such as control commands relative to the image pickup direction and the zoom magnification of the camera 101, to the camera server 100 on the basis of a program 303a stored in a ROM 303. When the CPU 302 downloads into a RAM 304 a program stored in the ROM 303, for example, a program for setting a variation speed in panning or tilting of the camera 101, the RAM 304 provides a work area so that the CPU 302 can execute various kinds of control.

An external storage 305 stores parameters and the like which are set by the user or a system manager, and includes a magneto-optical disk (MO), a compact disc (CD-ROM), a hard disk, a floppy disk or the like. An input part 307 is provided with a keyboard and a pointing device such as a mouse, and plays the role of allowing the user to input a control command for the camera 101.

A network I/F 308 performs communication with various devices connected to the network 901 via the network 901. A bus 309 interconnects the above-described constituent elements for communication with each other. In the first embodiment, a camera control signal or the like which is set at the control terminal 300 is transmitted from the control terminal 300 to the camera server 100 (refer to FIG. 2), and the control terminal 300 receives an image signal picked up by the camera 101 from the camera server 100.

A display part 306 includes a display device which is a bit-map display, a CRT or an LCD, and displays a picked-up image or enables the user to set an image-pickup-direction varying speed in panning or tilting of the camera 101, on a display screen by using the input part 307.

Figure 5:
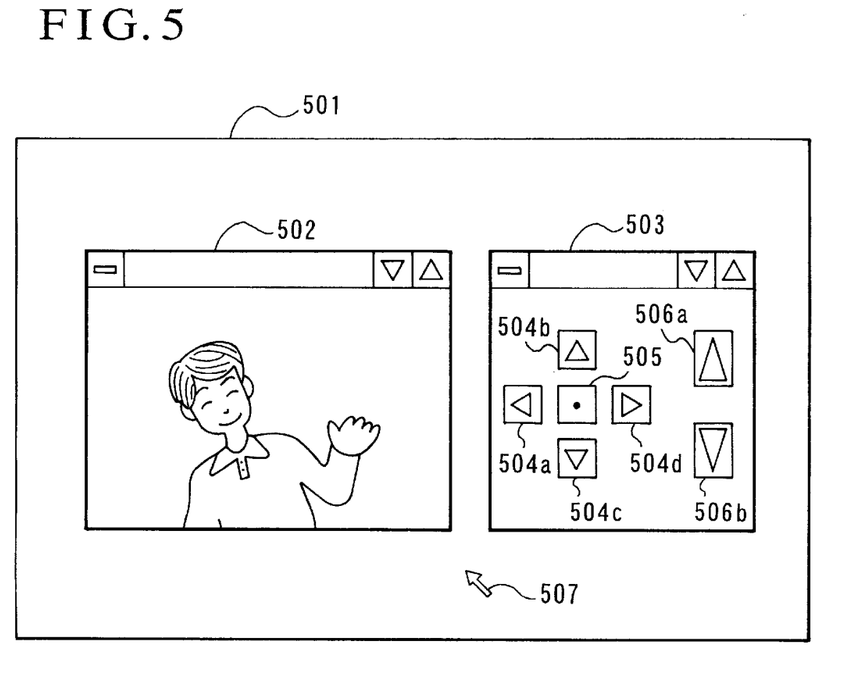
FIG. 5 is a view showing one example of a display screen of a display part in the control terminal shown in FIG. 3.

FIG. 5 shows one example of the display screen of the display part 306. An image display window 502 and an operating window 503 are displayed on a display screen 501.

The image display window 502 also serves to display the image picked up by the camera 101. The operating window 503 serves as an operating panel for operating the camera 101 which is picking up the image displayed on the image display window 502 (a camera for which the user at the control terminal 300 has a control right). If the user operates the mouse provided in the input part 307 and moves a cursor 507 to click on any of buttons 504a, 504b, 504c and 504d, an image-pickup-direction varying command, such as a command to pan or tilt the camera 101, is transmitted to the camera server 100 so that the image pickup direction of the camera 101 is varied leftward, upward, downward or rightward.

Buttons 506a and 506b are provided for controlling the zoom of the camera 101. If the user moves the cursor 507 and clicks on the button 506a, a zoom command to execute zooming toward the telephoto end is transmitted, whereas if the user moves the cursor 507 and clicks on the button 506b, a zoom command to execute zooming toward the wide-angle end is transmitted.

Figure 6:
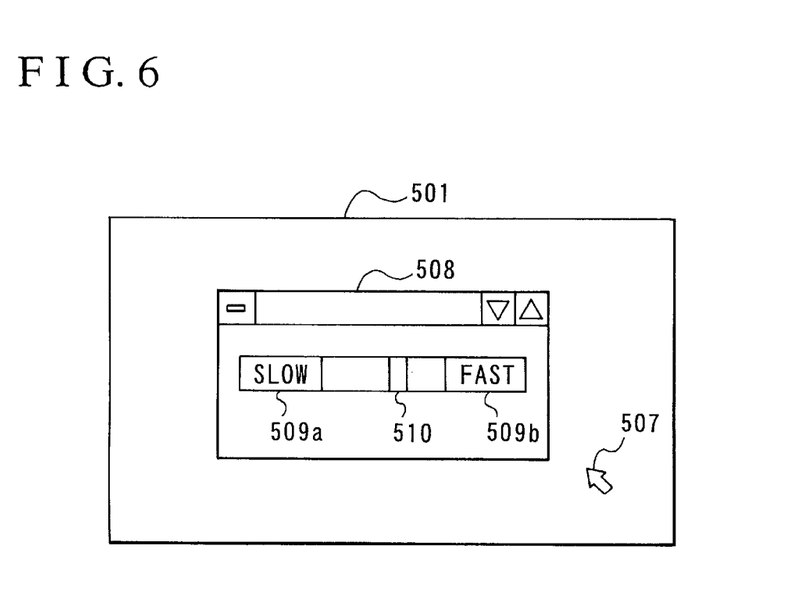
FIG. 6 is a view showing another example of the display screen shown in FIG. 5.

If the user moves the cursor 507 and clicks on a button 505, a speed adjusting window 508 for adjusting the image-pickup-direction varying speed in panning or tilting of the camera 101 by the buttons 504a, 504b, 504c and 504d is displayed as shown in FIG. 6.

Incidentally, a screen display similar to that of the display part 306 can be provided in the display part 209, and control commands for the camera 101 similar to those of the input part 307 can be generated by the input part 208.

In the speed adjusting window 508 shown in FIG. 6, if the user operates the mouse provided in the input part 307 and moves the cursor 507 to click on a button 509a, a cursor 510 moves toward the button 509a to transmit to the camera server 100 a command to decrease the variation speed in panning or tilting of the camera 101. If the user clicks on a button 509b, the cursor 510 moves toward the button 509b to transmit to the camera server 100 a command to increase the variation speed in panning or tilting of the camera 101.

The variation speed in panning or tilting of the camera 101 is determined by the position of the cursor 510. In addition, if the user drags the cursor 510 to move the position thereof, the variation speed in panning or tilting of the camera 101 can be adjusted.

The following description will be given in connection with an operation to be executed by the camera control system having the above-described construction when an image-pickup-direction varying command for the camera 101, such as panning or tilting, is executed from the control terminal 300.

Figure 7:
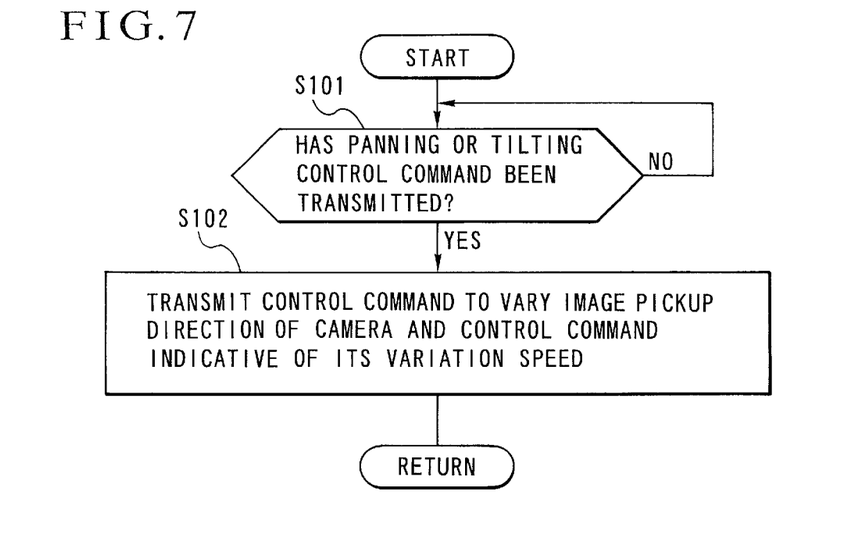
FIG. 7 is a flowchart showing the operation processing of the control terminal.

FIG. 7 is a flowchart showing operation processing to be executed when the user inputs a panning or tilting operation for the camera 101 on the side of the control terminal 300.

First, in Step S101, if the user operates the mouse provided in the input part 307 and moves the cursor 507 to click on any of the buttons 504*a*, 504*b*, 504*c* and 504*d*, the CPU 302 transmits data to the camera server 100 via the network I/F 308 (Step S102), the data containing an image-pickup-direction varying command corresponding to the clicked button and a control command such as a control command relative to a variation speed in panning or tilting, which speed is adjusted on the speed adjusting window 508 by the above-described method.

Figure 8:
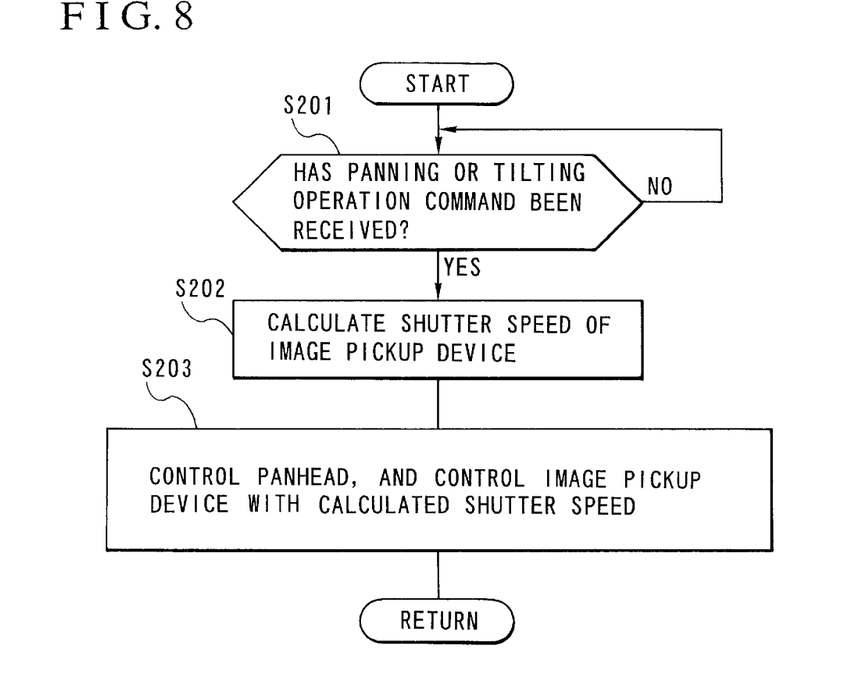
FIG. 8 is a flowchart showing the operation processing of the camera server.

FIG. 8 is a flowchart showing operation processing to be executed by the camera server 100 when an image-pickup-direction varying command such as "pan" or "tilt" is received at the network I/F 206 in the camera server 100.

The flowchart shown in FIG. 8 executes similar processing on the basis of the image-pickup-direction varying command such as "pan" or "tilt" and the variation speed at which the image pickup direction is varied like panning or tilting, all of which have been inputted from the input part 208.

First, in Step S201, if the network I/F 206 receives the data containing the panning or tilting variation command for the camera 101, the CPU 201 performs a calculation which will be described below, on the basis of the variation speed in panning or tilting which has been received at the same time (Step S202).

An image motion blur occurs when an image is made to flow within the time of an electronic shutter speed by a rotation of the panhead. In other words, if the flow of the image is accommodated within one pixel of the image pickup device 402, no image motion blur will occur, but if the flow of the image continues over several pixels, such flow will be recognized as an image motion blur. Incidentally, the electronic shutter speed is the storage time required for charge to be stored in the image pickup device 402.

For this reason, it is necessary to know the pixel size of the camera 101, i.e., what angle is equivalent to the size of one pixel. The size of one pixel can be obtained as W/N (degree/pixel) by using the angle of view W of the camera 101 and the number of effective pixels N per line of the image pickup device 402 (if the effective image area of the image pickup device 402 is not square, N differs according to whether the image-pickup-direction varying operation is panning or tilting.) Incidentally, since the angle of view W of the camera 101 is a constant determined by the construction of the camera 101 and an individual value of the zoom magnification, data on the angle of view W corresponding to each individual value of the zoom magnification is previously stored in the secondary storage 207. Similarly, the number of effective pixels N, which is a value determined by the effective image area of the image pickup device 402, is previously stored in the secondary storage 207.

The flow of the image can be obtained as s×v (degree), where v represents the moving speed of the panhead (the image-pickup-direction varying speed of the video camera) and s represents the electronic shutter speed (time) of the image pickup device. This s×v can be expressed as Nsv/W (pixel) in terms of the number of pixels.

Accordingly, if the following expression (1) is satisfied, an image motion blur due to a variation in the image pickup direction of the camera does not occur:

$$sv \leq W/N. \qquad (1)$$

At this time, the shutter speed s may be set to a value which satisfies the following expression:

$$s \leq W/(Nv). \qquad (2)$$

In Expression (2), the shutter speed s which satisfies Expression (2) is calculated by reading from the secondary storage 207 the angle of view W corresponding to a zoom ratio at the time of the calculation and the number of pixels N, and substituting the variation speed in panning or tilting which has been received from the control terminal 300 for the moving speed v of the panhead. In the first embodiment, the shutter speed s is set to s=W/(Nv) by way of example.

For example, it is assumed that the image-pickup-direction varying speed v of the camera 101 (the moving speed of the panhead) is 10 degrees/sec. At this time, if an image is picked up with a normal shutter speed of 1/60 sec, the image flows by 1/6 degree. Assuming that a still image is picked up with the number of pixels N per horizontal line being 640 and the angle of view W of the camera 101 being 30 degrees, the angle per pixel is 30/640 (degree/pixel)

In such a situation, the image picked up by the camera 101 suffers a motion blur of about 3.5 pixels. However, the motion blur of the image can be cancelled by setting the shutter speed to a speed which is 3.5 times the normal shutter speed, i.e., about 1/250 sec.

If the image-pickup-direction varying speed v of the camera 101 is 20 degrees/sec which is twice the above-noted one, the motion blur of the image becomes twice as large and, therefore, the shutter speed needs only to be set to twice as fast, i.e., 1/500 sec.

Referring back to the flowchart of FIG. 8, in Step S203, a control command signal indicative of the shutter speed of the camera 101 which has been calculated by the above-described calculation is transmitted from the camera I/F 204 to the camera 101 via the communication port 205*a*. In addition, a variation control signal for panning or tilting (the image pickup direction and the variation speed thereof) is transmitted from the camera I/F 204 to the panhead 102 via the communication port 205*b*.

As described above, the variation speed in panning or tilting of the camera 101 for the moving speed of the panhead 102 is previously determined, and an appropriate electronic shutter speed of the camera 101 is calculated on the basis of the variation speed, whereby even if the camera 101 is panned or tilted, the shutter speed is instantaneously controlled. Accordingly, it is possible to provide a camera control system capable of preventing flow of a display image (occurrence of a motion blur in the display image).

Incidentally, in the first embodiment, although the calculation on the shutter speed of the image pickup device 402 is performed on the side of the camera server 100, such calculation may be performed on the side of the control terminal 300. In this case, it is possible to achieve a similar effect by transmitting to the camera server 100 information such as a panning or tilting control command (the image pickup direction of the camera 101 and its variation speed) and a control command relative to the electronic shutter speed of the image pickup device 402.

Furthermore, in the first embodiment, although the panning or tilting variation speed of the camera 101 can be set on the side of the control terminal 300, a predetermined speed may be previously set in the panhead 102 so that the panhead 102 can be driven. In this arrangement, information relative to the predetermined speed is transmitted from the panhead 102 to the camera 101, and the camera control circuit 406 of the camera 101 executes the above-described calculation on the shutter speed.

The above description has referred to the arrangement in which the control terminal 300 issues a camera control command via the network 901. However, if the camera server 100 has a function equivalent to that of the control terminal 300 as shown in FIG. 2, it is also possible to adopt an arrangement in which a panning or tilting operation command for the camera 101 is inputted from the input part 208 provided in the camera server 100 so as to control the camera 101 without using the network. In this case as well, it is possible to achieve a similar effect by calculating the electronic shutter speed of the camera 101 in the CPU 201. Incidentally, the relation between the moving speed of the panhead and the corresponding shutter speed for which an image motion blur does not occur may be stored in the secondary storage 207 in the form of a table. With this arrangement, it becomes unnecessary to calculate the shutter speed in the CPU 201 and, therefore, the processing speed of the camera server 100 is increased.

(Second Embodiment)

A second embodiment of the present invention will be described below. In the second embodiment, a panning motor and a tilting motor provided in the panhead 102 can be simultaneously driven by the CPU 201, i.e., the panning and tilting of the camera 101 can be simultaneously controlled.

Incidentally, a panning or tilting input operation at the control terminal 300 according to the second embodiment can be performed not only on the operating window 503 but also on the image display window 502. If a user is to execute a panning or tilting input operation on the image display window 502, the user moves the cursor 507 and clicks on a picked-up image displayed on the image display window 502. At this time, the moving direction of the camera 101 due to panning or tilting is determined by the direction of the clicked position with respect to the center of the picked-up image displayed on the image display window 502.

The construction of the camera control system according to the second embodiment is identical to that of the camera control system according to the first embodiment, except that the panning and tilting of the camera 101 can be simultaneously controlled and the moving direction of the camera 101 due to panning and/or tilting can be inputted on the image display window 502. Accordingly, the description of the construction of the camera control system is omitted.

Figure 9:
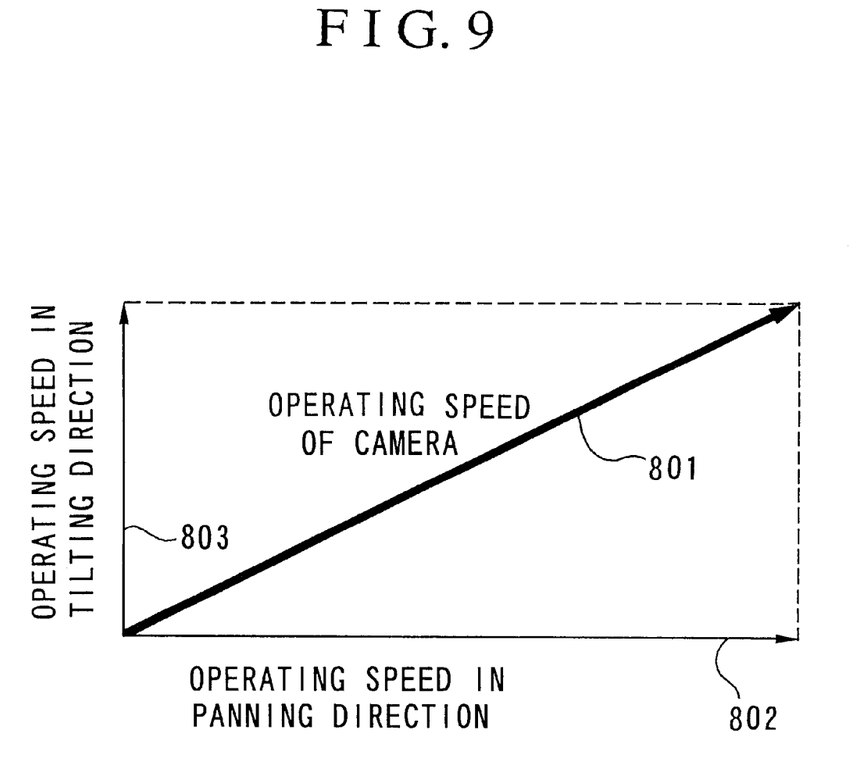
FIG. 9 is a view showing speed vectors of an operating direction of the camera in the camera control system according to a second embodiment of the present invention.

FIG. 9 shows speed vectors of the camera 101 which are obtained when the moving direction of the camera 101 is inputted as an obliquely upward and rightward direction by the above-described input operation. A vector 801 indicates a direction in which to vary the image pickup direction of the camera 101 and the variation speed of the camera 101, a vector 802 indicates the panning-direction variation speed component of the vector 801, and a vector 803 indicates the tilting-direction variation speed component of the vector 801.

In the image-pickup-direction varying operation of the camera 101 shown in FIG. 9, the panning-direction speed component is larger than the tilting-direction speed component. In this case, it is possible to prevent occurrence of an image motion blur by substituting the panning-direction speed component for the rotating speed v of the camera 101 in the shutter speed calculating method used in the first embodiment.

Specifically, in the second embodiment, the value of the shutter speed is obtained by substituting a larger one of the two speed components (the panning-direction speed component and the tilting-direction speed component) of the camera 101 for the rotating speed v of the camera 101 in the shutter speed calculating method used in the first embodiment, and the shutter speed of the image pickup device 402 is controlled on the basis of the obtained value. Accordingly, it is possible to provide a high-quality image free of image motion blur.

(Third Embodiment)

If the shutter speed is increased according to the moving speed of the panhead, the amount of light incident on the image pickup device 402 becomes smaller than when an image is picked up with the normal shutter speed, so that the picked-up image becomes darker.

To cope with this problem, it is generally known to open or close the iris or adjust the gain of an image signal in the camera 101 according to the strength of the output signal from the image pickup device 402. However, only if a variation in the output strength of the electrical signal outputted from the image pickup device 402 is detected to open or close the iris or adjust the gain after the shutter speed of the image pickup device 402 has been varied, the adjustment of the amount of light or the output is delayed due to a time lag.

In a third embodiment of the present invention which will be described below, the brightness of an image is predicted on the basis of the shutter speed calculated in the camera server 100 in the first or second embodiment, and a signal for adjusting the iris or the gain of an image signal is transmitted to the camera 101 together with a control signal indicative of the calculated shutter speed of the image pickup device 402.

Incidentally, since the constructions of the camera 101, the camera server 100 and the control terminal 300 are identical to those of the first embodiment, the description thereof is omitted.

Figure 10:
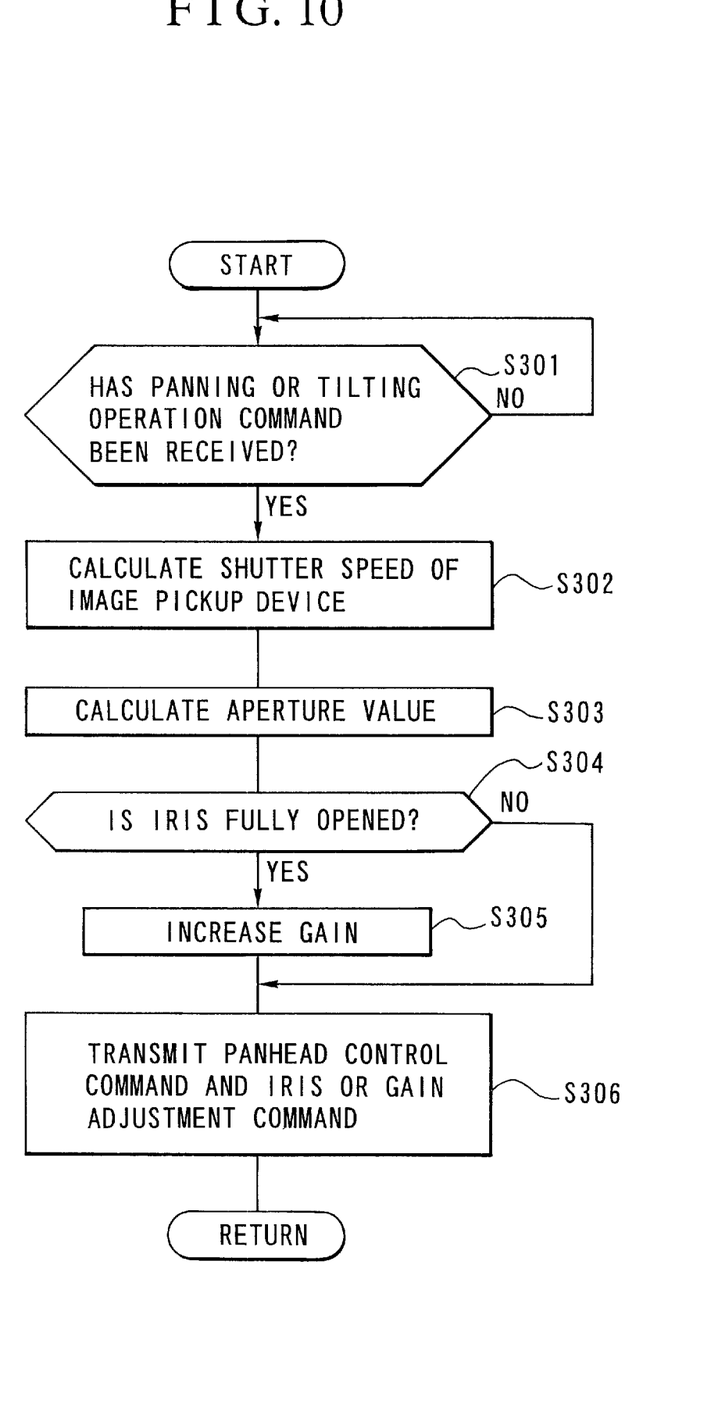
FIG. 10 is a flowchart showing the operation processing of the camera server in the camera control system according to a third embodiment of the present invention.

FIG. 10 is a flowchart showing operation processing to be executed in the camera server 100 according to the third embodiment. Operation processing to be executed in the control terminal 300 is identical to the flowchart of FIG. 7, and the description thereof is omitted.

First, in Step S301 of FIG. 10, if data containing a panning or tilting control command for the camera 101 is received at the network I/F 206, the process proceeds to Step S302, in which the CPU 201 performs a calculation similar to that performed in the first embodiment, on the basis of the moving speed in panning or tilting of the camera 101.

Then, in Step S303, the CPU 201 predicts the extent of a decrease in the output of an image signal obtained from the image pickup device 402 according to the calculated shutter speed, and determines the degree of opening of the iris. If it is determined in Step S304 that the extent of the decrease in the output of the image signal is such that even if the iris is fully opened, it is impossible to obtain the output of an image signal which is obtainable with the normal shutter speed, a control signal for increasing the gain so that the output of an appropriate image signal can be obtained is generated (Step S305). Incidentally, the determination of the degree of opening of the iris or the adjustment of the gain is performed on the basis of a table stored in the secondary storage 207. An appropriate degree of opening of the iris and an appropriate gain are obtained according to each shutter speed calculated with this table.

In Step S306, a control signal indicative of the moving direction and the moving speed of the camera 101 is transmitted from the panhead I/F 205 to the panhead 102. At the same time, a control signal for adjusting the iris or the gain for increasing the output of the image signal is transmitted from the camera I/F 204 to the camera 101 via the communication port 205a together with a control signal relative to the shutter speed of the image pickup device 402 which has been calculated by the CPU 201.

In the above-described method, during a panning or tilting variation of the camera 101, even if the shutter speed of the image pickup device 402 is varied, an image does not become dark, whereby an image of appropriate brightness can be obtained.

Incidentally, it is also possible to achieve the present invention by supplying a system or an apparatus with a storage medium on which the program code of software for realizing the functions of the above-described embodiments is recorded, and causing a computer (a CPU or an MPU) of the system or the apparatus to read out and execute the program code stored in the storage medium.

In this case, the program code itself read out from the storage medium realizes the functions of the above-described embodiments, and the storage medium which stores the program code constitutes part of the present invention.

The storage medium for supplying such program code may make use of, for example, floppy disk, hard disk, optical disk, magneto-optical disk, CD-ROM, CD-R, magnetic tape, nonvolatile memory card, ROM or the like.

Although the functions of the above-described embodiments can be realized by a computer which reads and executes a program code, the functions of the above-described embodiments may also be realized by an OS (operating system) running on the computer, in such a way that the OS performs actual processing in whole or part on the basis of an instruction of the program code.

In addition, the functions of the above-described embodiments may be realized in such a way that a program code read out from the storage medium is written into either a memory provided in an expansion board inserted in the computer or a memory provided in an expansion unit connected to the computer and a CPU provided on the expansion board or the expansion unit performs actual process in whole or part on the basis of an instruction of the program code.

If each of the present embodiments is applied to the storage medium, program codes corresponding to the flowcharts described previously are stored in the storage medium. In brief, modules essential to the camera control system according to the present embodiments are stored in the storage medium.

In the present invention, the program codes of at least a calculation module for calculating a shutter speed of an image pickup device according to the moving speed in panning or tilting of a camera are stored in the storage medium.

The present embodiments can be applied not only to the control of the zoom lens of a camera but also to a panning or tilting command if the CPU 302 is arranged to previously grasp the speed of panning or tilting of the camera and the time period of communication between the camera and the control terminal 300.

As is apparent from the foregoing description, in accordance with each of the present embodiments, during a panning or tilting operation of a camera, the shutter speed of the camera is controlled after having previously been calculated according to the speed of panning or tilting of the camera, whereby a motion blur is prevented from occurring in an image. In addition, since an aperture value or the gain of the output signal of an image pickup device is previously increased so that an output image is prevented from being darkened according to the shutter speed of the camera, it is possible to obtain an image of appropriate brightness.

What is claimed is:

1. A camera control system capable of controlling an image pickup direction of a video camera, comprising:

calculating unit for calculating a storage time required for charges to be stored by an image pickup device of the video camera the image pickup direction of which is being varied, on the basis of a desirable uniform speed at which to vary the image pickup direction of the camera, inputted by a user, the storage time calculated by said calculating unit satisfying a value not greater than a value obtained by dividing an image pickup angle of view per effective pixel of the image pickup device by the uniform speed of the image pickup direction of the video camera; and output unit for outputting a command for varying the image pickup direction of the camera and a control command for controlling the storage time, on the basis of the storage time calculated by said calculating unit.

2. A camera control system according to claim 1, further comprising amount-of-light adjusting unit for adjusting an amount of light entering the video camera, according to the storage time calculated by said calculating unit.

3. A camera control system according to claim 1, further comprising signal amplifying means for amplifying an image signal picked up by the video camera, according to the storage time calculated by said calculating means.

4. A camera control system according to claim 1, wherein said output unit outputs a command for being capable of simultaneously varying the image pickup direction of the video camera in both a panning direction and a tilting direction, and outputs a control command for controlling a shutter speed of the video camera on the basis of a larger one of a panning-direction speed component and a tilting-direction speed component of the image pickup direction of the video camera which is being varied.

5. A control method for a camera system capable of controlling an image pickup direction of a video camera, comprising:

a calculating step of calculating a storage time required for charges to be stored by an image pickup device of the video camera the image pickup direction of which is being varied, on the basis of a desirable uniform speed, at which to vary the image pickup direction of the camera, inputted by a user, the storage time calculated by said calculating step satisfying a value not greater than a value obtained by dividing an image pickup angle of view per effective pixel of the image pickup device by the uniform speed of the image pickup direction of the video camera; and an output step of outputting a command for varying the image pickup direction of the camera and a control command for controlling the storage time, on the basis of the storage time calculated by said calculating step.

6. A control method for a camera control system according to claim 5, further comprising an amount-of-light adjusting step of adjusting an amount of light entering the video camera, according to the storage time calculated by said calculating step.

7. A control method for a camera control system according to claim 5, further comprising a signal amplifying step of amplifying an image signal picked up by the video camera, according to the storage time calculated by said calculating step.

8. A control method for a camera control system according to claim 5, wherein said output step outputs a control command for being cable of simultaneously varying the image pickup direction of the video camera in both a panning direction and a tilting direction, and outputs a control command for controlling the storage time, on the basis of a larger one of a panning-direction speed component and a tilting-direction speed component of the image pickup direction of the video camera which is being varied.

9. A storage medium which stores an operation processing program for a camera control system capable of controlling an image pickup direction of a video camera, said storage medium allowing the camera control system to execute the following operation processing:

calculating a storage time required for charges to be stored by an image pickup device of the video camera the image pickup direction of which is being varied, on the basis of a desirable uniform speed at which to vary the image pickup direction of the camera input by a user, the calculated storage time satisfying a value not greater than a value obtained by dividing an image pickup angle of view per effective pixel of the image pickup device by the variation speed of the image pickup direction of the video camera; and outputting a command for varying the image pickup direction of the camera and a control command for controlling the storage time, on the basis of the calculated storage time.

10. A storage medium according to claim 9, further allowing the camera control system to execute the following processing:

adjusting an amount of light entering the video camera, according to the calculated storage time.

11. A storage medium according to claim 9, further allowing the camera control system to execute the following processing:

amplifying an image signal picked up by the video camera, according to the calculated storage time.

12. A storage medium according to claim 9, wherein the image pickup direction of the video camera can be simultaneously varied in both a panning direction and a tilting direction, and the storage time on the basis of a larger one of a panning-direction speed component and a tilting-direction speed component of the image pickup direction of the video camera which is being varied.

\* \* \* \* \*